United States Patent [19]

Diddens

[11] 3,758,872

[45] Sept. 11, 1973

[54] FAST RECOVERY CIRCUIT FOR AC AMPLIFIER

[75] Inventors: Paul A. Diddens, Denver, Colo.

[73] Assignee: Honeywell Inc., Minneapolis, Minn.

[22] Filed: Sept. 23, 1971

[21] Appl. No.: 183,037

[52] U.S. Cl. ....................... 330/185, 330/35, 330/51
[51] Int. Cl. ............................................. H03f 1/00
[58] Field of Search ........................ 330/3, 185, 147, 330/35, 51

[56] References Cited

UNITED STATES PATENTS

| | | | |
|---|---|---|---|
| 3,569,603 | 3/1971 | Kern | 84/1.19 |
| 3,355,670 | 11/1967 | Pastorizo | 330/9 |
| 3,613,020 | 10/1971 | McBride | 330/1 A X |
| 2,937,369 | 5/1960 | Newbold et al. | 340/177 |

*Primary Examiner*—Nathan Kaufman
*Attorney*—Arthur H. Swanson et al.

[57] ABSTRACT

A selector switch is operable to apply one of a plurality of input signals to a high impedance AC amplifier through a coupling network. A switching means is coupled to the selector switch for alternately and concurrently discharging one and charging a second charge storage means for each operation of the selector switch. The storage means being charged generates a charging signal of a predetermined duration which controls a switching device through a gating means. The switching device is operative in response to the gated charging signal and during the continuance thereof, to connect a relatively low impedance path across the input of the AC amplifier whereby to substantially reduce the response time of the AC amplifier.

1 Claim, 1 Drawing Figure

PATENTED SEP 11 1973
3,758,872
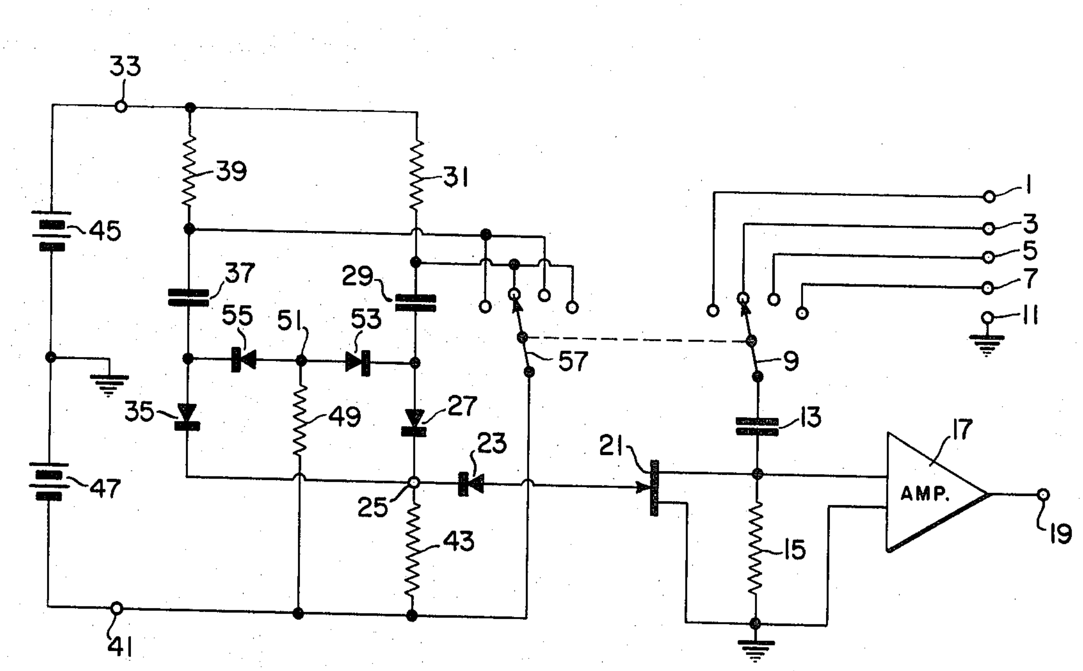
INVENTOR.
PAUL A. DIDDENS
BY Lockwood D. Burton
ATTORNEY.

FAST RECOVERY CIRCUIT FOR AC AMPLIFIER

The present invention relates generally to AC amplifier circuits and more particularly to an improved control circuit for reducing the response time of an AC amplifier to a newly applied input signal.

In many monitoring or controlling systems, a source signal representative of changes occurring in the monitored or controlled system is available. That source signal may contain an AC and a DC component. In certain systems, the AC components represents the informational changes to be monitored while the DC components has no informational value. AC amplifiers used in such systems are usually preceeded by a coupling circuit comprising a capacitor in series with the amplifier to block the DC component, and a relatively high resistor connected across the input terminals of the AC amplifier to provide maximum fidelity of AC component transfer. One disadvantage of such prior art apparatus becomes apparent when a plurality of source signals are to be amplified in sequence as is the case when a selector switch is used to scan a plurality of input channels. With each channel change, the AC amplifier will become saturated until the capacitor in the coupling circuit is charged to the level of the DC component present in the newly applied source signal. The delay thereby encountered before the AC amplifier is functional to amplify the AC component of the source signal, is known as the response time of the circuit. That response time is proportional to the time constant associated with the combination of the resistor and the capacitor. Heretofore, one way to reduce the response time was to decrease the value of the resistor. That method however, necessarily reduced the fidelity of the coupling circuit. As a result fast response coupling circuits had the disadvantage of low fidelity and alternatively, high fidelity coupling circuits have the disadvantage of slow response time.

It is accordingly an object of the present invention to provide an amplifier circuit which obviates the disadvantages of the prior art apparatus.

It is another object of the present invention to provide an improved AC amplifier coupling circuit with a high fidelity of AC component transfer, and also fast amplifier response time.

In accomplishing these and other objects, there has been provided, in accordance with the present invention, an improved coupling circuit for use with an AC amplifier. The coupling circuit includes a series capacitor to block the DC component of each input signal, and a relatively high resistor connected across the AC amplifier to insure high fidelity of AC component transfer. As various input signals are applied to the coupling circuit, a relatively low impedance path is effected across the AC amplifier for a predetermined period of time whereby to substantially reduce the otherwise relatively long response time inherent to high fidelity AC amplifier circuits.

A better understanding of the present invention may be had from the following detailed description, when read in connection with the accompanying drawing, in which the single figure is a schematic circuit diagram employing one embodiment of the present invention.

Referring to the drawing in detail, input terminals 1, 3, 5, and 7 are shown connected to distinct terminals of a first switching means or selector switch 9. A common terminal 11 is shown connected to a point of fixed reference potential or ground. The switch 9 is selectively operable to connect any one of the input channels or terminals 1, 3, 5, and 7 to a capacitor 13. A resistor 15 connects the other terminals of the capacitor 13 to ground. An AC amplifier 17 has its input terminals connected across the resistor 15 and provides an output signal at an amplifier output terminal 19. The circuit thus far described comprises a standard multiple input AC amplifier circuit.

A solid state switching device, as exemplified by a field effect transistor (FET) 21, is shown with its source and drain terminals connected across the resistor 15. The control electrode of the FET 21 is connected to the anode terminal of a gate or diode 23, the cathode terminal of which is connected to a common point 25. The common point 25 is connected, through the cathode to anode path of a diode 27, to one terminal of a first capacitor 29. The other terminal of the first capacitor 29 is connected through a resistor 31 to a first source terminal 33. A resistor 43 connects the common point 25 to a second source terminal 41. The resistor 31, the diode 27, and the resistor 43 comprise a first charging circuit. The common point 25 is connected, through the cathode to anode path of a diode 35, to one terminal of a second capacitor 37. The other terminal of the capacitor 37 is connected through a resistor 39 to the first source terminal 33. The resistor 39, the diode 35 and the resistor 43 comprise a second charging circuit. The first source terminal 33 may be maintained at a positive voltage with respect to the common ground reference by a battery or other suitable energy supply means 45. A second source terminal 41 may be maintained at a negative potential with respect to the common ground reference by the battery or other suitable energy supply means 47. The second source terminal 41 is connected through a resistor 49 to a junction point 51. A diode 53 has its anode terminal connected to the point 51 and its cathode terminal connected to the junction of the diode 27 and the first capacitor 29. A diode 55 has its anode connected to the junction point 51 and its cathode connected to the junction of the diode 35 and the second capacitor 37. The resistor 49 and the diode 53 comprise a first discharging circuit while the resistor 49 and the diode 55 comprise a second discharging circuit. A second switching means 57 is shown ganged to the selector switch 9 so that the second switching means 57 moves one position for every one position movement of the first switching means or selector switch 9. The switching means 57 is shown with four contact positions, having first and third contact positions connected together and second and fourth contact positions connected together. The first and third contact positions are in turn connected to the junction of the capacitor 37 and the resistor 39 while the second and fourth terminal positions of the switching means 57 are shown connected to the junction of the capacitor 29 and the resistor 31.

In operation, the capacitor 13 and the resistor 15 comprise a coupling means for coupling the signals applied at the input terminals 1, 3, 5, and 7 selectively to the AC amplifier 17. In the circuit shown, four different input signals are applied between the input terminals 1, 3, 5, and 7, respectively, and the ground terminal 11. Each input signal ordinarily includes an AC component and a DC component. The resistor 15 is ordinarily of a high enough value to provide maximum fidelity in the transfer of the AC component of the particular input signal being applied from the input terminals to the AC amplifier 17. The capacitor 13 serves to block the unwanted DC component of the input signal. As the selector switch changes positions, a different DC component may appear which DC component difference will be immediately coupled through the capacitor 13 and appear across the resistor 15. The voltage thereafter appearing across the resistor 15 may be great enough to saturate the amplifier 17 until the capacitor 13 is able to charge to the steady value of the new DC component of the input signal. That time element involved while capacitor 13 is being charged is known as the response time of the circuit.

The present invention provides a circuit for reducing that response time to a minimum and yet maintaining high fidelity AC coupling between the input signal and the amplifier 17. To that end, the FET 21 is rendered conductive for a predetermined length of time whenever a channel change is actuated. Whenever the FET 21 is conductive, a relatively low impedance path is present across the high valued resistor 15. That combination effectively provides a low impedance input circuit for the amplifier 17. Therefore, whenever the selective switch 9 is moved to a different position, FET 21 is rendered momentarily conductive and a relatively low resistance is effectively connected between the capacitor 13 and ground thereby providing a relatively small RC time constant coupling circuit. The capacitor 13 will then rapidly change to the DC component value of the new input signal presented thereto, thereby substantially reducing the response time of the AC amplifier 17. After a predetermined time delay, the FET 21 will again become non conductive, and the effective resistance presented across the input terminals of the AC amplifier 17 will again be the high valued resistor 15 which will assure maximum fidelity in coupling the AC component of the input signal to the AC amplifier 17.

It should be noted that only four input terminals are shown in the present example for the sake of clarity. In practice, however, many more input channels may be included. Also, the purpose of the switching means 57 is to provide alternate connections between the capacitors 29 and 37 and the second supply terminal 41 for every channel change of the selector switch 9. The form of the switching means 57 shown in figure represents one method of accomplishing the net result although many other methods may be used. The selector switch 9 and the switching means 57 are shown in the second of four different possible positions. It will be assumed that the ganged switches have been in that position for a period of time and that the capacitor 13 has been charged to the steady state value of the DC component present in the input signal applied to the input terminal 3. That being the case, only the AC component of the input signal will pass the capacitor 13 and appear across the resistor 15, thereby being applied to the AC amplifier 17. The capacitor 37 will have been charged to a steady state potential through the resistor 39, the resistor 43 and the diode 35. The capacitor 29 on the other hand, will have been discharged through the switching means 57 and through the resistor 49 and the diode 53. The cathode terminal of the diode 23 is held near the negative potential applied at the second terminal 41 and that potential is applied to the gate terminal of the FET 21, thereby rendering the FET 21 nonconductive.

When it is desired to amplify the signal presented between the input terminal 5 and the reference terminal 11, the selector switch 9 is moved to its third position. Since the second switching means 57 is coupled to the first switching means or selector switch 9, the switching means 57 is concurrently moved to its third position. The switching means 57, in moving from its second position to its third position, effectively open circuits the previous discharge path presented to the capacitor 29, and establishes a discharge path for the capacitor 37. At the instant of actuation of the switching means 57, a charging current begins to flow into capacitor 29 through resistors 31 and 43. The charging current flowing through resistor 43 causes a potential drop to appear across that resistor, raising the potential at the common point 25. That potential back-biases the diode 23 thereby causing the gate terminal of the FET 21 to be at or slightly above the ground reference potential. The potential at the gate terminal of the FET 21 causes the FET 21 to become conductive which, in turn, causes the resistance of the FET to drop a very low value. When that low value resistance is combined with the resistor 15 and the capacitor 13, the coupling circuit for the AC amplifier 17 adopts a smaller RC time constant, thereby decreasing the response time of the amplifier 17 to the newly applied input signal. While the FET 21 is conducting, the effective resistance from the capacitor 13 to ground is relatively small. The capacitor 13 will therefore rapidly charge to the value of the DC component of the newly applied input signal. When the charge on the capacitor 29 has been stabilized, no further charging current flows through the resistor 43, and the potential at the common point 25 returns to the potential at the source terminal 41. When the voltage at the common point 25 reaches a value equal to the pinch-off voltage of the FET 21, the drain current of the FET 21 goes to zero and the FET 21 assumes a nonconductive state. While the capacitor 29 is being charged, the capacitor 37 is being discharged through the switching means 57, the resistor 49, and the diode 55. The charging of the capacitor 29 and the discharging of the capacitor 37 will occur in substantially the same time period, after which the circuit will be ready to perform another operational cycle when the selector switch 9 is switched to another input terminal. Since the time constant associated with either the capacitor 37 and resistors 39 and 43, or the capacitor 29 and the resistors 31 and 43, is substantially shorter that the time constant associated with the capacitor 13 and the resistor 15, a fast amplifier response time is possible without sacrificing input signal transfer fidelity.

Thus there has been provided an improved control circuit which, when used in combination with a multiple channel sensing circuit wherein one of a plurality of input signals is selectively applied throug a coupling means to an AC amplifier, allows both high fidelity AC component transfer from the input channel to the AC amplifier, and also rapid response time of the AC amplifier.

I claim:

1. A circuit comprising input terminal means arranged for connection to a plurality of input signals, said input signals generally including an AC and a DC component;

coupling means including a DC blocking means and an impedance means serially connected between first and second terminals, of said coupling means;

first switching means selectively actuable for connecting one of said input signals across said first and second terminals of said coupling means;

amplifier means having an input means connected across said impedance means;

first and second supply terminals for connection to a source of supply voltage;

first and second capacitors each having first and second terminals respectively;

first and second resistors connecting said first supply terminal with said first terminals of said first and second capacitors, respectively;

a third resistor connecting said second supply terminal with a first common point;

first and second diode means for providing anode to cathode connections between said first common point and said second terminals of said first and second capacitors respectively;

a fourth resistor connecting said second supply terminal with a second common point;

third and fourth diode means for providing cathode to anode connections between said second common point and said second terminal of said first and second capacitors respectively;

second switching means ganged to said first switching means for simultaneous operation with said first switching means, said second switching means being operable to alternately provide a connection between said first terminals of said first and second capacitors and said second supply terminal, a switching device having output electrodes, and a control electrode, said output electrodes being connected across said impedance means; and means connecting said second common point to said control electrode of said switching device.

* * * * *